United States Patent [19]

Manservisi et al.

[11] Patent Number: 4,562,911

[45] Date of Patent: Jan. 7, 1986

[54] QUICK-COUPLING DEVICE

[75] Inventors: Renato Manservisi, Bologna; Sandro Corticelli, Castello d'Argile, both of Italy

[73] Assignee: SASIB S.p.A., Bologna, Italy

[21] Appl. No.: 564,737

[22] Filed: Dec. 22, 1983

[30] Foreign Application Priority Data

Dec. 22, 1982 [IT] Italy .................. 12695 A/82

[51] Int. Cl.[4] .................. F16D 43/26; F16D 1/06
[52] U.S. Cl. .................. 192/86; 192/25; 192/89 A; 74/813 L; 74/814
[58] Field of Search .............. 192/86, 25, 89 A, 18 B, 192/33 R, 89 R; 74/813 L, 814, 405

[56] References Cited

U.S. PATENT DOCUMENTS

| | | | |
|---|---|---|---|
| 1,618,479 | 2/1927 | Schull | 192/86 |
| 1,630,816 | 5/1927 | Wilcox | 192/86 |
| 2,232,584 | 2/1941 | Aitken | 192/86 |
| 2,685,948 | 8/1954 | Froeman et al. | 192/25 |
| 2,710,086 | 1/1955 | Stahl | 192/86 |
| 2,822,072 | 2/1958 | Goss | 192/86 |
| 2,827,143 | 3/1958 | Mayercordt | 192/86 |
| 2,971,620 | 2/1961 | Rice, Jr. | 192/86 |
| 4,116,320 | 9/1978 | Quilliam | 192/89 A |
| 4,291,556 | 9/1981 | Mason | 192/89 A |
| 4,307,795 | 12/1981 | Roy | 192/89 A |
| 4,310,087 | 1/1982 | Gawler | 192/33 R |
| 4,319,495 | 3/1982 | Salicini | 192/86 |

*Primary Examiner*—Raymond A. Nelli
*Attorney, Agent, or Firm*—Spencer & Frank

[57] ABSTRACT

A drive shaft (1) rotatably journalled in a stationary block (2) has keyed thereto a driving member (5), while a driven member (6) is rotatably mounted on the shaft. The driving member imparts to the shaft a positive intermittent rotation, for example by steps of one revolution or an integer fraction of one revolution. Co-axially mounted on the shaft is a disc (8) having a periphery with at least one keyway (108) if the intermittent rotation of the shaft is by one-revolution steps. The keyway-recessed disc cooperates with a latch (9) which is slidably but not rotatably mounted on the driven member and which is parallel to the axis of the shaft. The latch has a pronged end (109) which, in the dwell position of the intermittent motion of the shaft, is aligned with the head (110) of a rod (10) that is slidably mounted in the stationary block parallel to the shaft and that is driven by a pneumatic cylinder (12). The latch is spring-biassed against the disc in registry with the region of the keyway or keyways, while the cylinder is controlled to disengage the latch from the keyway or keyways on completion of each step of the transmitted intermittent motion, whereby the latch is moved backwards so as to lock the driven wheel in position until the next step is to be transmitted.

11 Claims, 4 Drawing Figures

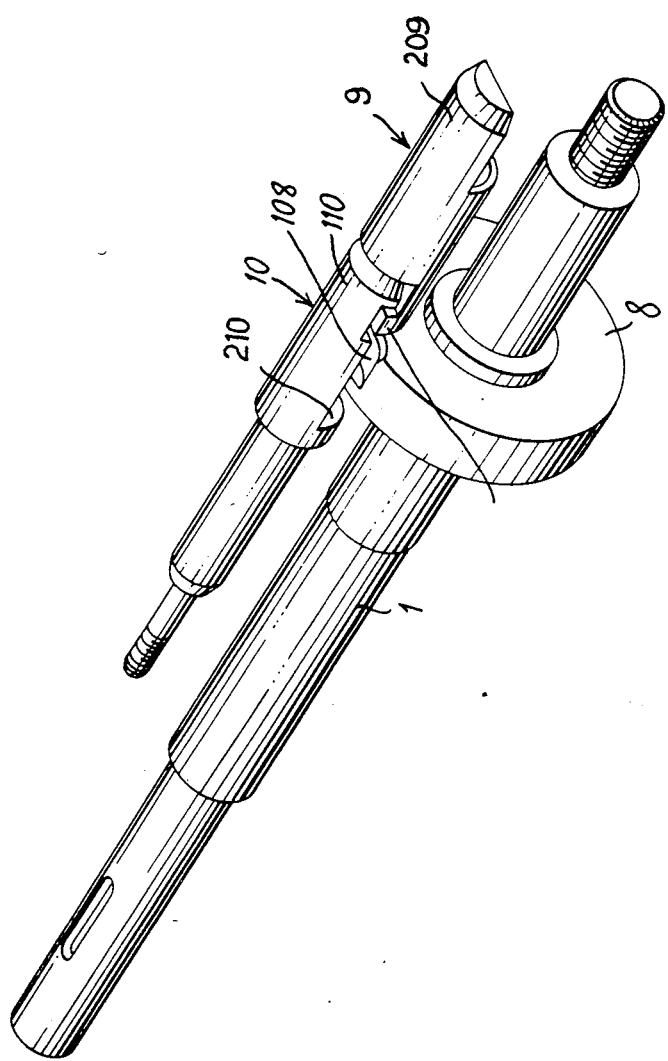

QUICK-COUPLING DEVICE

BACKGROUND AND SUMMARY OF THE INVENTION

This invention relates generally to the automatic operating machines, and specifically to the packing machines of the type wherein the intermittent or step-by-step movement of a driven portion of the machine, is coordinately, selectively and at due time off the timely intermittent movement of a driving portion of said machine.

In certain machines of the type specified above, the problem often arises to transmit said intermittent motion from said driving portion of said driven portion of the machines exactly according to the operative timed relationship between the portions of said machines.

Stated otherwise, the problem arises to discontinue coordinately and selectively the transmission of the intermittent motion, and respectively to resume it, from the driving to the driven mechanisms, exactly in accordance with the timing characteristics of the intermittent motion between these two driving and driven mechanisms.

Specifically, the invention relates to the case wherein said intermittent motion to be transmitted and interrupted in a controlled and timed manner is an intermittent regular positive rotation, or step-by-step rotation, of a drive shaft which is forced to effect constant timed revolutions, each of a one-revolution amplitude, or of an integer fraction of one revolution, individually intercalated with timed dwell periods of said shaft.

Generally speaking, said shaft receives said intermittent rotation from said driving portion of the machine through a rotary driving member, such as a toothed wheel keyed on said shaft, and transmits said rotation to an associated driven portion of the machine through a rotary driven member which could be, generally, another toothed wheel rotatably mounted on said shaft and is operatively associated with a controlled coupling device for the timed coupling and uncoupling of the driven wheel with respect to said intermittent drive shaft.

A controllable coupling device for the timed rotational coupling and uncoupling of a driven member of a machine with respect to a driving member having a regularly intermittent rotation has already been proposed; however, said device is relatively complicated, requires the use of an auxiliary shaft having a continuous rotary movement, and is not suitable for very high production rates, because the coupling and uncoupling operations effected thereby require the axial displacement of a cylindrical cam along said auxiliary shaft, which implies a response time which is not entirely satisfactory.

In order to comply with the mechanical requirements of the ever growing production rates of the present packing machines and the like, this invention proposes a reversible, rotary, controlled, axial-engagement, quick-coupling device suitable for an in-line, timed transmission of an intermittent rotary motion, even of reversible type, from a drive shaft, regularly rotating step-by-step, to a rotary driven member, such as a toothed wheel, co-axial with said shaft, wherein the intermittently-rotating drive shaft is solid with a co-axial transfer disc or flange having generally an annular series of keyways, corresponding in number to the steps of the intermittent motion in one revolution, starting from a single keyway in case of a maximum one-revolution step, while the driven wheel, which is freely rotatable on the intermittent shaft, has embedded therein, parallelly to said shaft, a spring-loaded latch urging with an end thereof against an annular region of said disc at the keyways thereof, and cyclically collimates axially with each successive pusher of a series of regularly-arranged controlled pushers, which are in the same number as said keyways and are angularly positioned in registry with the dwell positions of said intermittent shaft, whereby each pusher, under the action of a respective control means, such as a pneumatic cylinder, abuts end-to-end against the latch and pushes it back into the driven wheel so as to disengage it from the respective keyway of the disc, while holding said wheel in a stationary position whereas said disc is free to follow at all times the intermittent movement of the shaft.

BRIEF DESCRIPTION OF THE DRAWINGS

These and other features of the invention, and the advantages resulting therefrom, will be apparent from the following detailed description of a preferred embodiment thereof, made as a non-limiting example with reference to the accompanying dracings, wherein:

FIG. 4 is a simplified perspective view showing the intermittently-rotating shaft with a transfer disc provided with one keyway, operatively aligned with the latch of the driven wheel and with the pneumatic cylinder pusher.

DESCRIPTION OF THE PREFERRED EMBODIMENT

Figure 1:
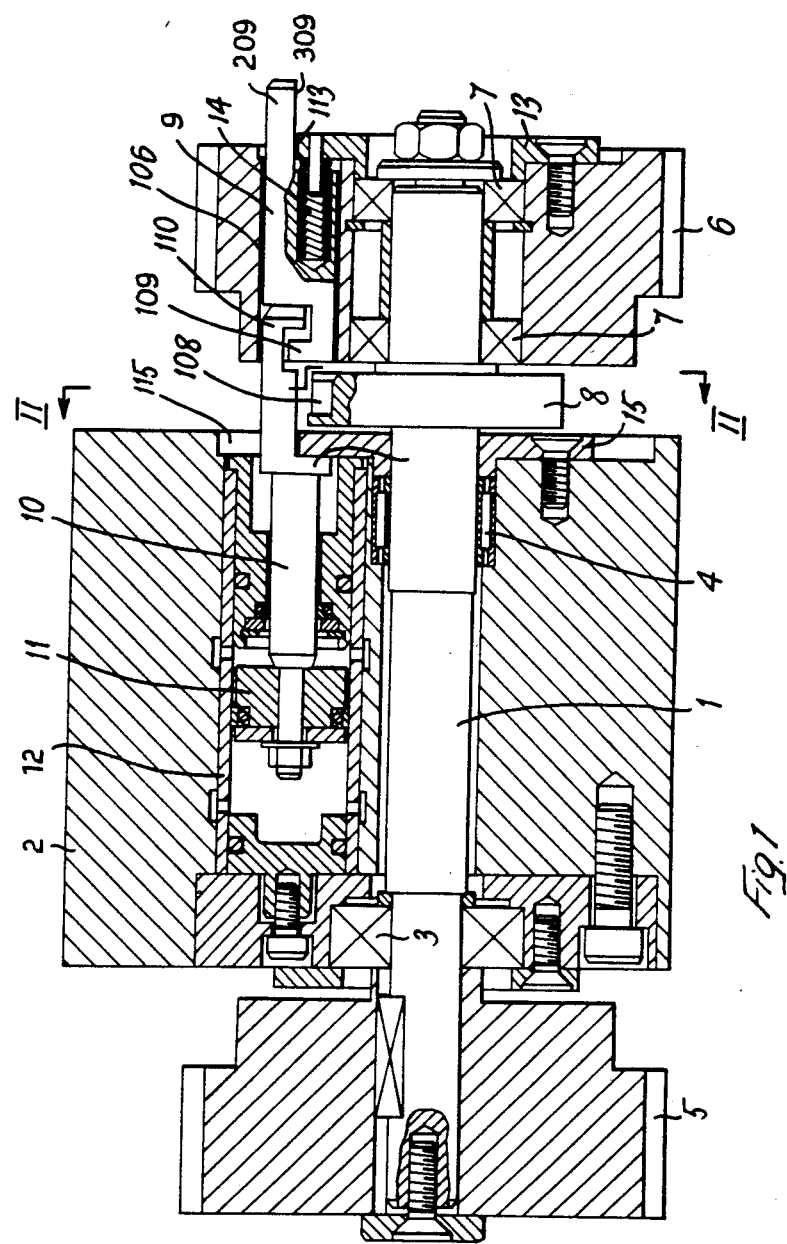
FIG. 1 is a longitudinal sectional view of a quick-coupling device according to the invention for the timed transmission of a rotary intermittent motion by steps having each the amplitude of one revolution.
Figure 2:
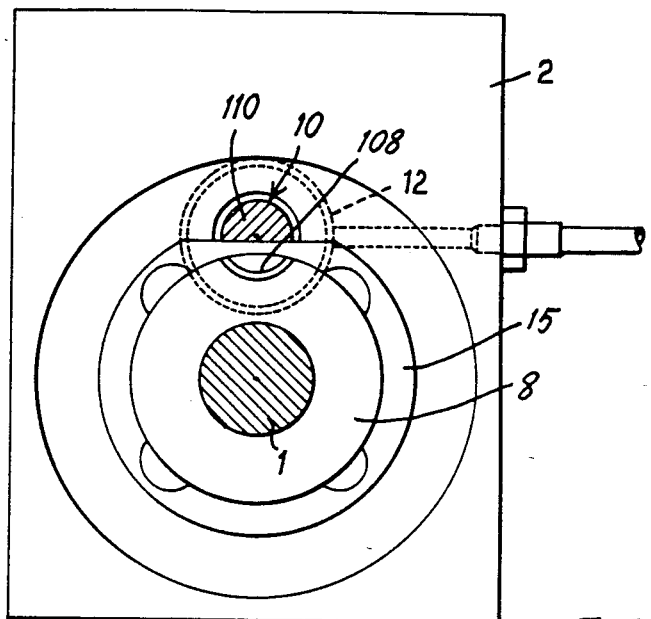
FIG. 2 is a cross-sectional view of the lines II—II of FIG. 1.
Figure 3:
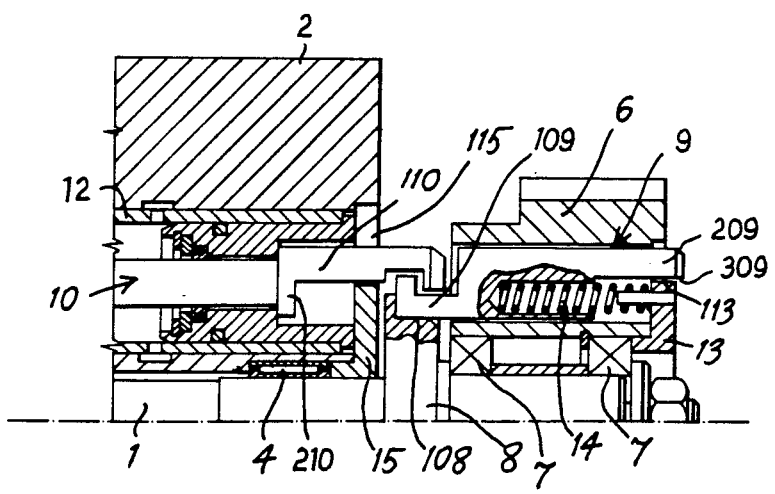
FIG. 3 is a fragmentary longitudinal sectional view showing the spring-loaded latch of the driven wheel, while engaged in the keyway of the transfer disc solid with the intermittent shaft, before the activation of the pneumatic cylinder which pushes back said latch out of the keyway of the disc.

With reference to the Figures of the drawings, generally in the same order as their notation, a drive shaft 1, rotatably journalled in a stationary block 2 through bearings 3 and 4, has keyed thereto a driving member, such as a toothed wheel or pulley 5, while a driven member, such as a toothed wheel or pulley 6, is rotatably mounted on said shaft through bearings 7.

The driving member 5 motivates the shaft 1 with a positive regular intermittent rotation which, in this exemplary embodiment, is assumed to occur by steps having each the amplitude of one revolution, said steps being intercalated with exactly-sized dwell periods.

Of course, generally speaking, each step of the intermittent motion might last a suitable integer fraction of a revolution, which would entail constructional changes appearing during the following description.

Said shaft 1 comprises a co-axial flange or disc 8 having formed in the periphery thereof at least one keyway 108 if each step of the movement has, as exemplified, the amplitude of one revolution. If each step is an integer fraction N of one revolution, the disc 8 has a peripheral regular series of N keyways 108.

The disc 8 constitutes the rotary transfer member of the controlled axial-engagement coupling device according to the invention for linearly and timely transmitting an intermittent motion from the shaft 1 to the driven wheel 6.

The keyway-recessed disc 8, 108 cooperates with an engagement coupling member in the form of a latch 9 slidably though not rotatably mounted in a housing 106 of the rotatably-mounted wheel 6, said housing being formed therein parallel to the axis of the shaft 1.

The pronged end 109 of the latch 9, in the dwell period of the intermittent motion of the shaft 1, is cyclically opposite to and aligned with the leading end or head 110 of the rod 10 of a piston 11 of a pneumatic double-acting cylinder 12 which is mounted in the stationary block 2 parallelly to the shaft 1.

In this illustrated embodiment of a coupling device designed for an intermittent rotary motion having one-revolution steps, only one pneumatic cylinder 12 or equivalent activating means, such as an electromagnet, is provided. More generally, if an intermittent motion of N fractionary steps in each revolution is to be transmitted, the block 2 will comprise a regular series of N cylinders 12, said cylinders being orderly arranged at the positions of the dwell periods intercalated in the intermittent movement of the shaft 1.

The other end 209 of the latch 9 has a lunette cross section with a flat face 309 slidingly engaging a corresponding flat face 113 of the flange 13 which closes the bore of the hub of the driven wheel 6.

In the housing 106 of said wheel 6, a compressed coil spring 14 urges the latch 9 against the transfer disc 8 at the periphery thereof comprising the keyway or keyways 108, whereinto the end of the latch will be thus engaged, possibly after a short sliding contact against the side face of the disc.

The pusher/puller 10, under the control of the pneumatic cylinder 12, issued shortly before the keyway 108 arrives at the dwell position of the disc 8, slides shortly with the hooked end 110 thereof against the side face of the driven wheel 6 and finally meets the orifice of the housing 106, penetrates thereinto and abuts against the pronged end 109 of the latch 9, thus displacing the latch 9 in said housing against the action of the spring 14 to disengage said pronged end 109 from the keyway 108 of the transfer disc 8.

By supplying compressed air to the cylinder 12 so as to move the pusher/puller 10 toward the left, the spring 14 moves first the pronged end 109 of the latch 9 to slide against the side face of the disc 8. When the keyway 108 arrives at the dwell position of the intermittent motion, the latch will get engaged in this keyway due to the concurrent actions of the pusher/puller 10 and spring 14, which completes the path of movement of the latch 10.

Thus, each resumption of the intermittent drive begins at all times from the dwell position, while during the uncoupling period the driven wheel 6 is in a locked condition because it is engaged by the end 110 of the pusher 10, which is then in an extended position, due to the continued activation of the pneumatic cylinder 12.

Therefore, each resumption of the intermittent drive from the shaft 1 to the driven wheel 6 occurs with strict compliance to the timing, i.e. to the pre-established relative angular position between said shaft and wheel.

The pusher/puller 110 passes through a slot 115 in a flange 15 which closes the passage bore in the block 2 and is provided with a limit stop 210 which will abut against the inner face of said flange. Should the shaft 1 rotate intermittently by steps having the amplitude of half a revolution, the disc 8 will be provided with two diametrically-opposite keyways 108.

More generally, if the intermittent shaft 1 rotates by steps of 360°/N (wherein N is an integer), the transfer disc 8 will be formed with a regular series of N keyways 108 angularly spaced of 360°/N from each other, while the series of pushers/pullers 10, 110 will comprise N members angularly positioned around the intermittent shaft 1 in registry with the dwell positions between the successive steps of the intermittent rotation. Obviously, the driven wheel 6 shall be provided of only one latch 9 at all times.

It is apparent from the above that the invention provides a controlled, in-line axial-engagement, quick-coupling device for the timed transmission of a regular intermittent rotation, wherein the driven member (in this example, the wheel or pulley 6) of a driven section of a machine is rotatably mounted on an intermittently-moving shaft 1 which is actuated by a driving section of the machine through a rotary driving member (such as the wheel or pulley 5), wherein a reversible locking or keying device is provided between said shaft and driven wheel, and is capable of assuming alternatively, during every dwell period of the intermittent motion, an arrangement wherein it solidarizes the driven wheel with the intermittent shaft, or, respectively, an arrangement wherein said driven wheel is disengaged from said shaft and is prevented from rotating until a control is issued to resume the timed transmission of the intermittent shaft.

Of course, the invention is not limited to the exemplary embodiment here shown and described, but broad changes and modifications can be made thereto, especially depending upon the various and specific requirements of each practical circumstance, without departing from the broadest scope of the basic principle of the invention, as set forth above and as claimed hereinafter.

What we claim is:

1. A controlled, in-line axial-engagement quick-coupling device of reversible and invertible type, for use with a machine having a driving portion and a driven portion to provide timed transmission of periodically occuring intermittent rotation from the driving portion to the driven portion of the machine, the intermittent rotation having steps of rotary motion separated by dwell periods, comprising:

a drive shaft interposed operatively between said driving portion and said driven portion of the machine;

a rotary driving member keyed to said drive shaft to receive the intermittent rotation from said driving portion;

a driven member rotatably mounted on said drive shaft to transmit the intermittent rotation of the drive shaft to said driven portion of the machine; and a controlled, reversible and invertible keying mechanism means operatively mounted between said drive shaft and said driven member for alternately assuming, substantially during said dwell periods, one of a first engagement control arrangement wherein said driven member is locked to said drive shaft, and a second control arrangement wherein said driven member is uncoupled from the drive shaft and rotation of said driven member is temporarily prevented during at least one step of the intermittent rotation.

2. A device according to claim 1, wherein said drive shaft has at least one dwell angular position, and wherein said keying mechanism means comprises:
   a transfer disc having a face with a regular array of at least one keyway adjacent the periphery of said face, the number of keyways in the array corresponding to the number of steps of rotary motion in one revolution of said drive shaft;
   a latch element having an axis and an end, said latch element being slidably mounted on said driven member so that the axis of said latch element is parallel to the axis of said drive shaft and so that said end of said latch element is positioned to engage said at least one keyway;
   spring means for biasing said latch element toward said face of said transfer disc;
   a regular array of at least one pusher element that has an axis and an end, the number of pusher elements in the array corresponding to the number of keyways, each said at least one pusher element being slidably mounted with its axis parallel to that of said drive shaft and with its end positioned to abut the end of said latch element; and
   means for pushing said at least one pusher element against said latch element to push said latch element into said driven member so that said latch element is disengaged from said at least one keyway and so that said driven member is locked into position while said drive shaft and transfer disc are free to follow said intermittent rotation.

3. A device according to claim 2, wherein said end of said latch element comprises a hook and the end of each said at least one latch element comprises a hook that is configured to interlock with said hook of said latch element, and further comprising means for pulling said at least one pusher element out of said driven member and into a keyway to permit transmission of the intermittent rotation to resume.

4. A device according to claim 2, wherein said means for pushing comprises a fluid-operated cylinder.

5. A device according to claim 1, wherein said driven member comprises a toothed wheel and said driving member comprises a toothed wheel.

6. A device according to claim 1, wherein said machine is a cigarette packing machine.

7. A device for transmission of intermittent rotation, comprising:
   a mounting block;
   a drive shaft rotatably mounted on said mounting block;
   means mounted on said drive shaft for imparting the intermittent rotation to the drive shaft;
   a flange affixed to said drive shaft, said flange having first and second faces and a keyway in said first face;
   a driven member mounted on said drive shaft adjacent said first face of said flange, said driven member being rotatable with respect to said drive shaft and having an elongated cavity with an opening that is directed toward said first face;
   an elongated latch member slidably mounted in said cavity, said latch member having an axis that is parallel to the axis of said drive shaft and having an end that is positioned to engage said keyway;
   an elongated pusher element having a first portion with an end and having a second portion with an axis, said second portion being slidably mounted on said mounting block adjacent said second face of said flange, with the axis of said second portion being parallel to the axis of said drive shaft, said first portion extending past the periphery of said flange and supporting the end thereof at a position to abut the end of said latch member;
   means for pushing the end of said latch element into said keyway to lock said driven member to said drive shaft; and
   means for pushing said second portion of said pusher element toward said second face of flange to move the end of said first portion against the end of said latch element and into the opening in said driven member so that said driven member is released from said drive shaft and locked to said mounting block.

8. A device according to claim 7, wherein said means for pushing the end of said latch element comprises spring means for biassing said latch element toward said first face of said flange.

9. A device according to claim 7, wherein the end of said latch element is configured as a first hook and the end of said pusher element is configured as a second hook that interlocks with said first hook, and wherein said means for pushing the end of said latch element comprises means for moving said second portion of said pusher element away from said second face of said flange so that said second hook pulls said first hook into said keyway.

10. A device according to claim 9, wherein said means for pushing said second portion of said pusher element toward said second face of said flange and said means for moving said second portion of said pusher element away from said second face of said flange comprise a pneumatic cylinder that is operationally connected to said second portion of said pusher element.

11. A device according to claim 7, wherein said first face of said flange has a plurality of keyways that are equally spaced apart, and wherein there is an elongated pusher element and means for pushing the second portion thereof corresponding to each respective keyhole.

* * * * *